(12) United States Patent
Slater et al.

(10) Patent No.: US 6,979,974 B2
(45) Date of Patent: Dec. 27, 2005

(54) ROTOR POSITION DETERMINATION IN A SWITCHED RELUCTANCE MACHINE

(75) Inventors: Howard James Slater, Durham (GB); James Douglas Alexander Chambers, York (GB)

(73) Assignee: Switched Reluctance Drives Limited, Harrogate (GB)

(*) Notice: Subject to any disclaimer, the term of this patent is extended or adjusted under 35 U.S.C. 154(b) by 48 days.

(21) Appl. No.: 10/830,957

(22) Filed: Apr. 23, 2004

(65) Prior Publication Data
US 2004/0212359 A1    Oct. 28, 2004

(30) Foreign Application Priority Data
Apr. 24, 2003 (GB) .................................. 0309340

(51) Int. Cl.[7] .............................. H02P 7/05; H02P 7/00
(52) U.S. Cl. ................................. 318/701; 324/76.11
(58) Field of Search ................................ 318/254, 701, 318/721, 798–799, 807–812; 324/76.11, 324/76.77, 76.79, 207.11, 207.23, 207.25

(56) References Cited

U.S. PATENT DOCUMENTS

| | | |
|---|---|---|
| 4,074,179 A | 2/1978 | Kuo et al. |
| 5,015,939 A | 5/1991 | Konecny |
| 5,589,751 A | 12/1996 | Lim |
| 5,689,165 A | 11/1997 | Jones et al. |
| 5,793,179 A | 8/1998 | Watkins |
| 5,859,518 A | 1/1999 | Vitunic |
| 5,864,217 A | 1/1999 | Lyons et al. |
| 5,920,175 A | 7/1999 | Jones et al. |
| 5,955,861 A | 9/1999 | Jeong et al. |
| 6,051,942 A | 4/2000 | French |
| 6,153,956 A | 11/2000 | Branecky |
| 6,448,738 B1 * | 9/2002 | Burton et al. ............... 318/807 |
| 6,586,903 B2 | 7/2003 | Moriarty |
| 2002/0140395 A1 * | 10/2002 | Tazawa et al. .............. 318/727 |
| 2002/0149342 A1 * | 10/2002 | Nakata et al. .............. 318/801 |

FOREIGN PATENT DOCUMENTS

| | | |
|---|---|---|
| EP | 0 470 685 A1 | 2/1992 |
| EP | 0 573 198 A1 | 12/1993 |
| EP | 0 780 966 A2 | 6/1997 |
| EP | 0 856 937 A2 | 8/1998 |
| WO | WO 91/02401 | 2/1991 |

OTHER PUBLICATIONS

Mvungi, N.M., et al., "Accurate Sensorless Rotor Position Detection in an SR Motor," EPE Firenze, vol. 1, 1991, pp. 390-393.

Ray, W.F., et al., "Sensorless Methods for Determining the Rotor Position of Switched Reluctance Motors," EPE Brighton, 1993, pp. 7-13.

(Continued)

*Primary Examiner*—Bot LeDynh
(74) *Attorney, Agent, or Firm*—Dicke, Billig & Czaja, PLLC (57) ABSTRACT

A switched reluctance drive is controlled without using a physical rotor position detector. The control method causes current to flow continuously in a single winding when the rotor is turning and detects position by finding either the peak of the current waveform or some other feature which can be uniquely related to the position of the rotor.

22 Claims, 4 Drawing Sheets

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

Gallegos-Lopez, G., et al., "A New Rotor Position Estimation Method for Switched Reluctance Motors Using PWM Voltage Control," EPE '97 Trondheim, 1997, pp 3.580-3.585.

Gallegos-Lopez, Gabriel, et al., "A New Sensorless Method for Switched Reluctance Motor Drives," IEEE Transactions on Industry Applications, vol. 34, No. 4, Jul.-Aug. 1998.

* cited by examiner

ROTOR POSITION DETERMINATION IN A SWITCHED RELUCTANCE MACHINE

CROSS-REFERENCE TO RELATED APPLICATION

The subject matter of this application is related to the subject matter of British Patent Application No. GB 0309340.8, filed Apr. 24, 2003, priority to which is claimed under 35 U.S.C. § 119 and which is incorporated herein by reference.

BACKGROUND OF THE INVENTION

1. Field of the Invention

Embodiments of this invention relate to sensorless rotor position determination in reluctance machines, particularly, but not exclusively, in switched reluctance machines.

2. Description of Related Art

The control and operation of switched reluctance machines generally are described in the paper "The Characteristics, Design and Applications of Switched Reluctance Motors and Drives" by J M Stephenson and R J Blake delivered at the PCIM'93 Conference and Exhibition held in Nurnberg, Germany, 21–24 Jun. 1993, which is incorporated herein by reference. In that paper the "chopping" and "single-pulse" modes of energization of switched reluctance machines are described for operation of the machine at low and high speeds, respectively.

Figure 1:
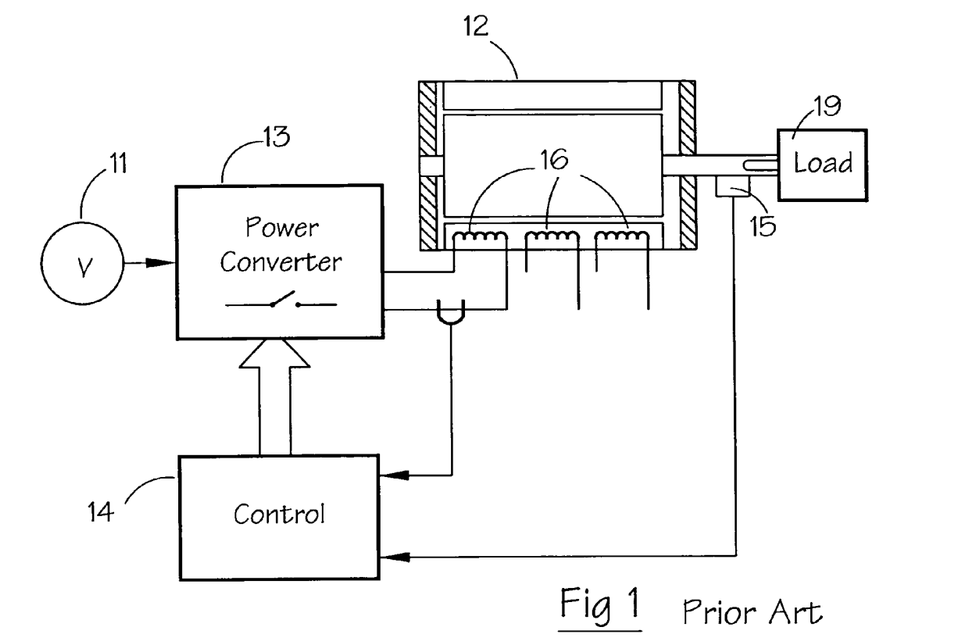
FIG. 1 shows a typical prior art switched reluctance drive.
Figure 2:
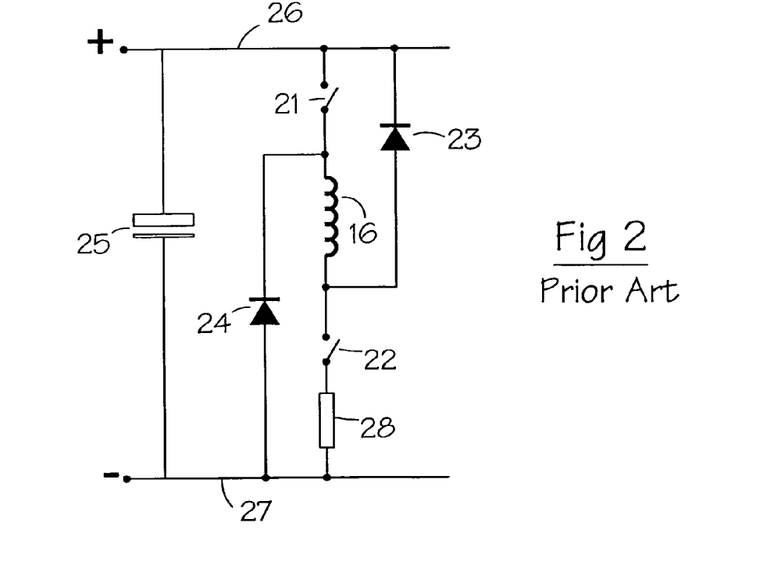
FIG. 2 shows a known topology of one phase of the converter of FIG. 1.

A typical prior art drive is shown schematically in FIG. 1. This includes a DC power supply 11 that can be either a battery or rectified and filtered AC mains. The DC voltage provided by the power supply 11 is switched across phase windings 16 of the motor 12 connected to a load 19 by a power converter 13 under the control of the electronic control unit 14. One of the many known converter topologies is shown in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from, or returned to, the supply. In practical terms, the capacitor 25 may comprise several capacitors connected in series and/or parallel and, where parallel connection is used, some of the elements may be distributed throughout the converter. A resistor 28 is connected in series with the lower switch 22 to provide a current feedback signal. A multiphase system typically uses several "phase legs" of FIG. 2 connected in parallel to energize the phases of the electrical machine.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical or magnetic sensor mounted on the stator. A pulse train indicative of rotor position relative to the stator is generated and supplied to control circuitry, allowing accurate phase energization. This system is simple and works well in many applications. However, the rotor position transducer increases the overall cost of assembly, adds extra electrical connections to the machine and is, therefore, a potential source of unreliability.

Various methods for dispensing with the rotor position transducer have been proposed. Several of these are reviewed in "Sensorless Methods for Determining the Rotor Position of Switched Reluctance Motors" by W F Ray and I H Al-Bahadly, published in the Proceedings of The European Power Electronics Conference, Brighton, UK, 13–16 Sep. 1993, Vol. 6, pp 7–13, incorporated herein by reference.

Many of these methods proposed for routine rotor position estimation in an electrically driven machine use the measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 3. The storage of this data involves the use of a large memory array and/or additional system overheads for interpolation of data between stored points.

Figure 4A:
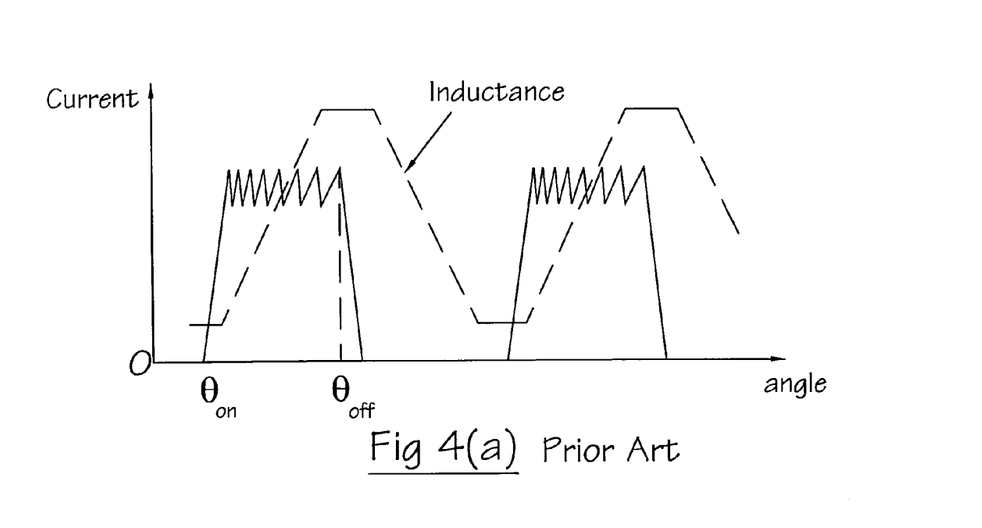
FIG. 4(a) shows a typical motoring current waveform in chopping control.

Some methods make use of this data at low speeds where "chopping" current control is the dominant control strategy for varying the developed torque. Chopping control is illustrated graphically in FIG. 4($a$) in which the current and inductance waveforms are shown over a phase inductance period. (Note that the variation of inductance is depicted in idealized form.) These methods usually employ diagnostic energization pulses in non-torque-productive phases (i.e. those phases which are not energized directly from the power supply at a particular moment). A method suited to low-speed operation is that proposed by N M Mvungi and J M Stephenson in "Accurate Sensorless Rotor Position Detection in an S R Motor", published in Proceedings of the European Power Electronics Conference, Firenze, Italy, 1991, Vol. 1, pp 390–393, incorporated herein by reference. These methods work best at relatively low speeds, where the length of time taken up by a diagnostic pulse is small compared to the overall cycle time of an inductance period. As speed rises, the pulse occupies a longer part of the cycle and soon the point is reached where reliable position information is not available.

Figure 4B:
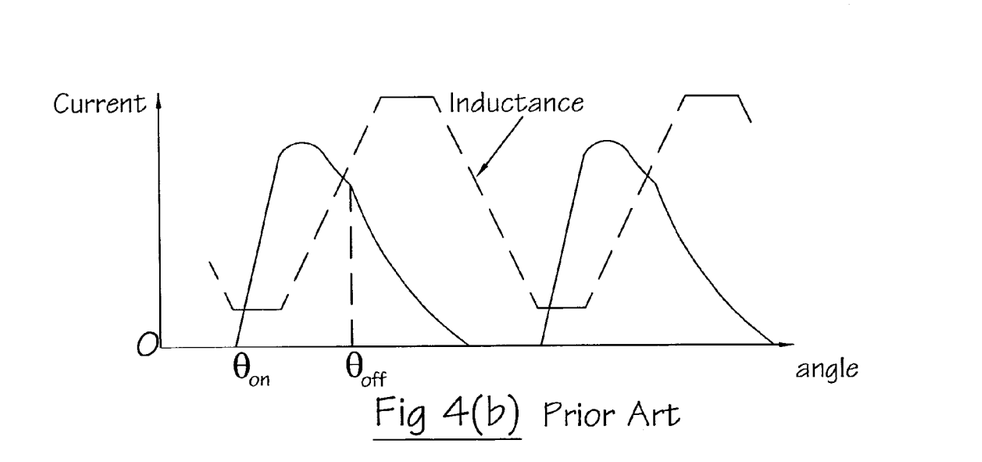
FIG. 4(b) shows a typical motoring current waveform in single-pulse control.

Other methods operate in the "single-pulse" mode of energization at higher speeds. This mode is illustrated in FIG. 4($b$) in which the current and inductance waveforms are shown over a phase inductance period. These methods monitor the operating voltages and currents of an active phase without interfering with normal operation. A typical higher speed method is described in International Patent Application WO 91/02401, incorporated herein by reference.

Figure 4C:
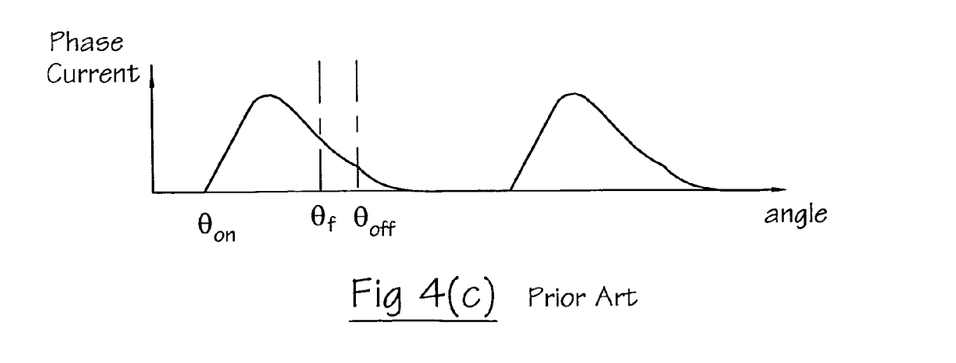
FIG. 4(c) shows a typical motoring current waveform in single-pulse control using freewheeling.

Instead of opening both switches simultaneously, there are circumstances in which it is advantageous to open the second switch an angle $\theta_f$ later than $\theta_{on}$, allowing the current to circulate around the loop formed by the closed switch, the phase winding and a diode. A typical waveform is illustrated in FIG. 4($c$). This technique is known as "freewheeling" and is used for various reasons, including peak current limitation and acoustic noise reduction. Having to store a two-dimensional array of machine data in order to operate without a position sensor is an obvious disadvantage. Alternative methods have been proposed, which avoid the need for the majority of angularly referenced information and instead store data at one angle only. One such method is described in European Patent Application EP0573198A (Ray), incorporated herein by reference. This method aims to determine the phase flux-linkage and current at a predefined angle by adjusting the diagnostic point in accordance with the calculated deviation away from the desired point. Flux-linkage is estimated by integrating (with respect to time) the measurement of the voltage applied to the phase. Two one-dimensional tables are stored in one embodiment, one of flux-linkage versus current at a referenced rotor angle and another of the differential of flux-linkage with respect to rotor angle versus current. By monitoring phase voltage and current, the deviation away from a predicted angle can be assessed, with the aid of the look-up tables, and system operation can be adjusted accordingly.

To avoid the flux-linkage integrator drifting (due to unwanted noise in the system and imperfections in the integrator) it is set to zero at the end of each conduction cycle, when the current has fallen to zero and the phase winding is no longer linking any flux. This method is a "predictor/corrector" method, in that it initially predicts when the rotor will be at a reference position, measures parameters of the machine when it believes the reference position has been reached, and uses the results of these measurements to detect error in the prediction and hence take corrective action by adopting a new prediction for the next reference position.

The phase inductance cycle of a switched reluctance machine is the period of the variation of inductance for the, or each, phase, for example between maxima when the rotor poles and the relevant respective stator poles are fully aligned. FIG. 4(a) shows the inductance profile in idealized form, whereas in practice the corners of the profile are rounded due to flux fringing in the air and to saturation of the ferromagnetic paths.

It is known that the shape of the phase current waveform of a switched reluctance machine in single-pulse mode is related to the inductance profile of the phase winding. In particular, the start of the rising portion of the inductance profile, which is due to the onset of overlap between the stator and rotor poles, corresponds to the rollover when the phase current changes from rising to falling in the phase inductance cycle. EP1109309A, incorporated herein by reference, discusses this phenomenon and uses the natural peak in current, in single-pulse operation, as the basis of a rotor position detection method.

SUMMARY OF THE INVENTION

If there is no excitation on the winding, for example, if a machine is coasting, or excitation is lost because the history of previous excitation has been corrupted because of noise or mechanical disturbances, a position detection method is desired which will estimate position and give a seamless transfer into excitation without having to stop the drive. The inventors have understood that in certain cases there is a desire for a sensorless control method that can operate over a wide speed range without prior knowledge of the excitation history of the drive.

It is an object of embodiments of the present invention to provide a robust and cost-effective method of determining rotor position without using a rotor position transducer.

In one form, embodiments of the invention provide a method and system of determining the position of a moving rotor by means of a continuous current created in one phase winding that has a waveform which contains the basic temporal information relevant to various significant events in the phase inductance cycle of the machine. From one of these features it is possible to derive rotor position information.

Figure 3:
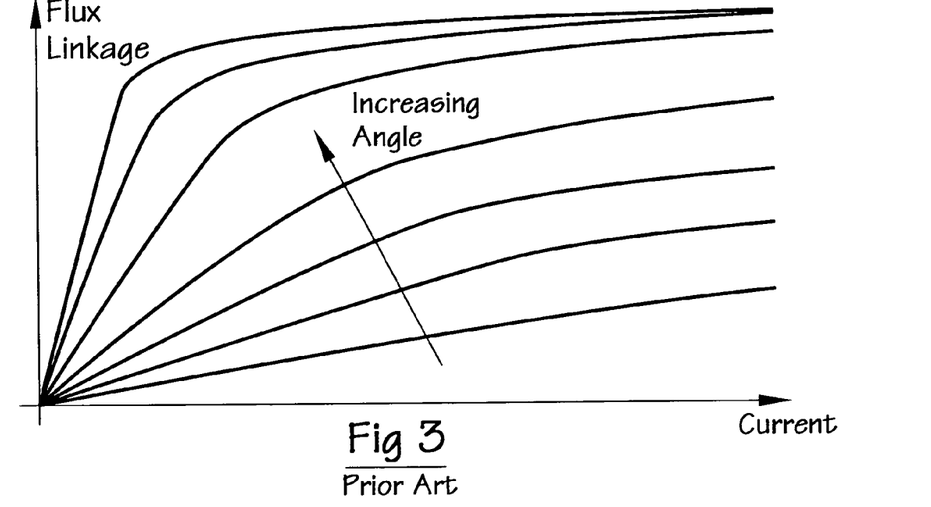
FIG. 3 shows typical flux-linkage and phase current curves, with rotor position as a parameter.

One benefit of embodiments of the present invention is that they do not require any prior knowledge of the magnetic profile of the machine, for example, as shown in FIG. 3. Thus, such embodiments do not require large amounts of stored data and can be robust in the presence of noise on the waveforms from which they deduce position. This is in contrast to the prior art referred to above.

An embodiment of the invention provides a method of determining rotor position for an electrical machine having a stator, with at least one phase winding, and a rotor, the method comprising: establishing a continuous current in the phase winding while the rotor is moving, the current having a waveform related to an inductance profile of the machine which is cyclical with rotor position; detecting a predetermined feature in a cycle of the waveform; and deriving rotor position information from the occurrence of the feature.

The electrical machine is a switched reluctance machine, according to embodiments of the invention.

Continuous current is established by, for example, voltage pulses applied across the phase windings. The occurrence of the voltage pulses can be asynchronous as they are used only to establish the continuous current. Because of this they do not have to be referenced to any aspect of the phase inductance cycle. The voltage profile applied to the phase is optionally a voltage pulse and a lower amplitude voltage of opposite polarity between pulses.

A convenient feature on which to base assessment of rotor position is the rollover of current coincident with the start of rising inductance in the phase inductance profile.

Embodiments of the invention are particularly applicable to a coasting machine because the relatively small current induced in a single phase winding has a waveform that contains all the information required to determine rotor position that would otherwise be found in the equivalent current waveform when the machine is operated.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

The illustrative embodiment to be described uses a 2-phase switched reluctance drive in the motoring mode, but any phase number could be used, with the drive in either motoring or generating mode.

Figure 5:
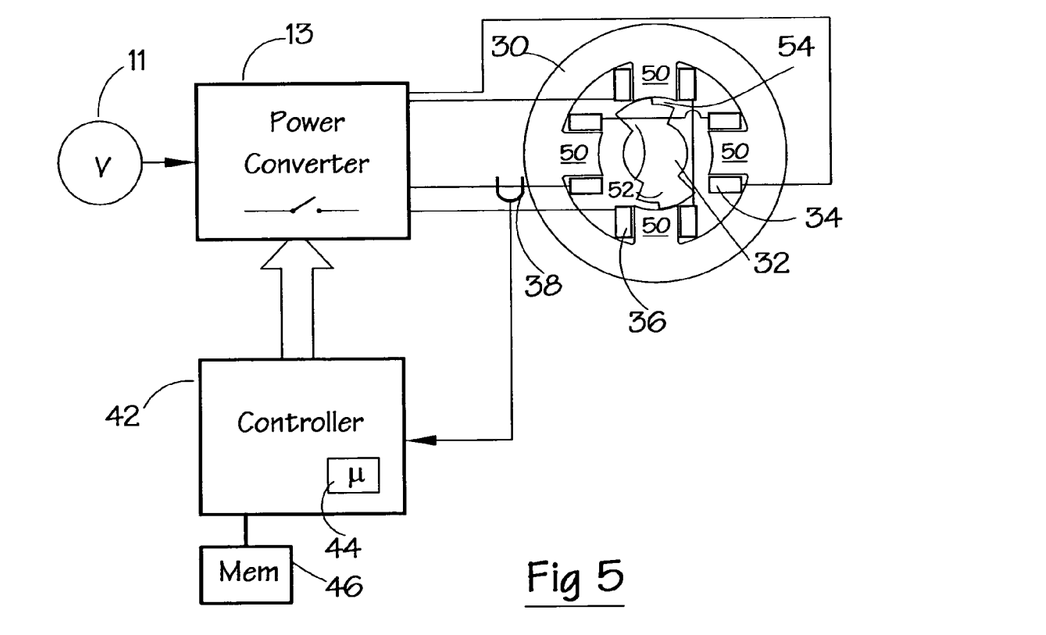
FIG. 5 shows in schematic form a switched reluctance drive, according to an embodiment of the invention.

FIG. 5 shows a system for implementing the method in which one form of the invention is embodied. In this, a power converter 13, which is optionally the same as that shown in FIG. 1, is provided for controlling the switched reluctance machine. Controlling the converter 13 is a controller 42, which in this embodiment incorporates a processor, particularly a digital signal processor 44, e.g. one from the Analog Devices 2181 family, and associated program and data memory 46. Alternative embodiments incorporate a microprocessor or other form of programmable device known in the art. The processor runs according to the program code stored in the memory 46 to execute the method embodiments of the present invention. The illustrated 2-phase machine has a stator 30 and a rotor 32. The stator has four poles 50, on which are wound phase windings 34/36. The rotor has rotor poles 52 and, to assist with starting the machine, has a stepped air gap 54. The stepped air gap is not essential: the face of each rotor pole may have a conventional arcuate profile. One skilled in the art will realize that a machine with different phase number or pole combinations also is useable, since the invention is not necessarily limited to any particular machine topology.

Figure 6:
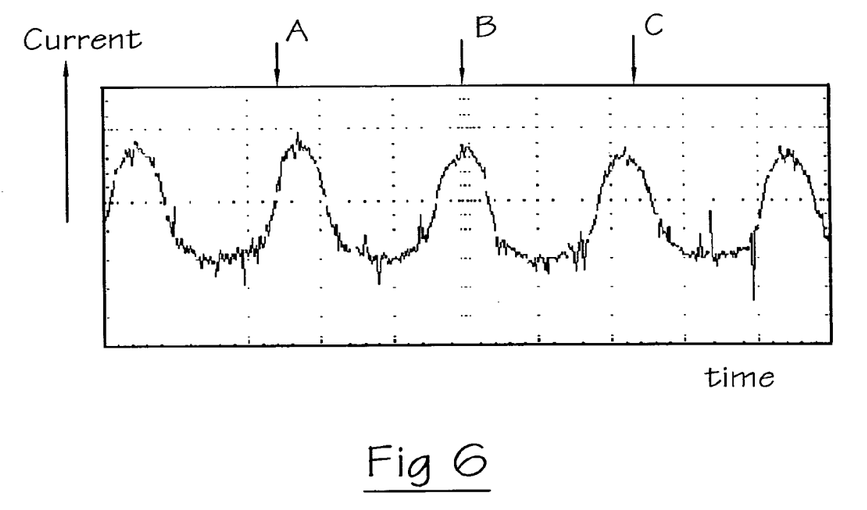
FIG. 6 shows a current waveform, according to an embodiment of the invention.

According to an embodiment of the invention, a stream of data is derived from a rotating machine by actively injecting into a single phase winding a voltage that is small relative to the excitation voltage applied across the winding, and subsequently allowing the current induced by the voltage to freewheel for the remainder of the complete phase cycle. The voltage profile, and particularly the voltage pulse, is chosen so that a continuous current is maintained in the phase winding. By injecting the small voltage as pulses, the information required for determining rotor position relative to the stator is created in the resultant cyclical phase current, which is shown in the trace of FIG. 6. Method embodiments of the invention are used on a machine that is moving (e.g. rotating) but is not necessarily electrically driven by excitation of the phase winding(s). This is known as 'coasting'. This circumstance has previously been considered a particularly difficult situation in which to establish rotor position due to its dynamic nature. However, as can be seen in FIG. 6, the injected voltage creates a cyclical phase current waveform that exhibits the features from which rotor position can be determined.

The magnitude of the injected voltage should be chosen carefully for the particular drive being considered, but typically has an average value below 10% of the rated excitation voltage applied to drive the machine. The voltage is optionally provided from the main bus by applying PWM to the main switch(es) of one phase. Alternatively, a separate low-voltage source (either pulsed or invariable with time) is connected to a nominated phase. In both cases, the application of positive voltage causes the flux-linkage of the phase winding to rise at a rate determined by the magnitude of the voltage. When the voltage is removed, the negative voltage drop resulting from the sum of the voltage drops across the winding resistance, the diode and the switch cause the flux to fall at a lower rate. The current settles into a steady pattern, which is always positive and cyclic with the inductance profile of the winding, as shown by the trace in FIG. 6, which is considered in more detail below.

Figure 7:
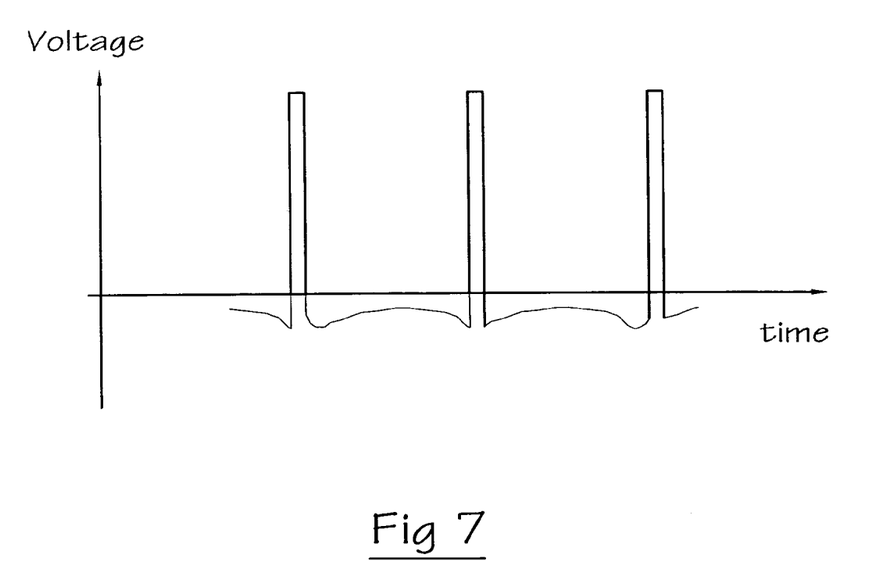
FIG. 7 shows a phase voltage waveform, according to an embodiment of the invention.

It should be noted that there is no part of the cycle when the full negative voltage of the voltage bus is applied to the winding, unlike in normal operation of the machine. The voltage alternates between a short burst of high, positive voltage and a long period of much lower, negative, freewheeling voltage, as illustrated in FIG. 7. There is a very small continuous flux in the winding; the current produced is small compared to the current in normal operation; and the net torque on the rotor is zero. Because of this, the theory suggests that there is no upper limit on the magnitude or duration of the voltage pulses as long as the net torque is zero. However, the intermittent nature of the injected voltage pulses will become intrusive if the pulses are raised to high levels. The intrusiveness could, for example, give rise to torque ripple or noise, which is likely to be unacceptable in some applications. The lower limit on the voltage is that which allows the continuous current in the phase to be maintained.

FIG. 6 shows an actual oscilloscope trace of a phase current waveform under these conditions. Several features can be noted on this trace. First, there is significant noise present on the signal. While some of this may be a true indication of the current in the winding, some of it is measurement error, caused by interference on the current measurement from, e.g., switching actions in the vicinity. Nevertheless, the position detection of embodiments of the invention is robust against these phenomena and special filtering is not normally required. Second, the current peaks are not uniform. This can be due to a variety of factors, including ripple on the voltage supply bus. Again, the method is robust to these variations, since there is no comparison to an absolute current level.

According to an embodiment of the invention, continuous rotor position information is available by detecting the occurrence of peaks in phase current created by the actively injected voltage pulses. Various methods of detecting the peak of the current waveform are possible. According to one embodiment the simplest form is for the processor 44 to be programmed to take a continuous stream of samples of current from the sensor 38 and to compare the most recent with the previous sample. If both samples are equal, then there has been no change in the magnitude of the current waveform. Hence, the point of zero rate of change of phase current with respect to time (di/dt) has been reached which, as described in EP1109309A, is assumed to be the point of pole overlap. However, while detection of the zero di/dt seems like an ideal solution to the sensorless issue, in practice it has limitations and can be unreliable, principally due to the noise on the measured current waveform.

A more robust approach is to use a method of slope detection which detects the onset of the downward slope after the peak current has been reached. Though this inevitably inserts a delay in detection of the point of pole overlap, the delay is, in fact, constant and this can be compensated for in the controller. The controller can therefore predict exactly when the next point of pole overlap will be encountered.

In this embodiment, in order to perform slope detection, the microprocessor 44 includes an algorithm that compares a sample with the previous sample (as in the implementation described earlier). However, rather than looking for two equal samples, it ignores all the samples greater than or equal to the previous one (i.e. when the waveform is increasing or is flat). Once the point is reached where the present sample is less than the previous sample, it can be assumed that the peak (zero di/dt) point has been passed and the current is now falling with a negative slope. This technique generates a sensorless detection pulse typically two samples after the true peak, with the sampling time being a fixed known quantity. This known time of two sample periods can then be compensated in the angle control software.

Improved performance can be achieved by modifying the algorithm programmed into the processor to detect a continuous negative slope over several samples, rather than assuming that the first negative slope computed is the true first sample after the peak of the current waveform. By looking for, say, two or more negative slope results from the samples and ignoring any zero change results (due, e.g., to slow rates of change at low speed and poor A/D resolution) it is safe to assume that the slope is definitely falling. The detection pulse is further delayed after the point of zero di/dt by a minimum of three samples, but this can be compensated for in the controller 42 as it is a known quantity of time.

Since there is no need to have even approximate knowledge of the rotor position to implement embodiments of this invention (unlike many other methods of position detection), the PWM pulses of voltage may be applied at any point in the inductance cycle, i.e., they can be asynchronous to the current waveform, allowing the method to be implemented without knowledge of rotor speed. Close inspection of FIG. 6 shows that the asynchronous application of the PWM pulses happened at the points marked A, B & C on the trace. Since point C is in the area where slope detection is being carried out, the application of the voltage pulse there might cause a spurious result in the slope detection. This can be avoided by limiting the application of the pulses to those regions in the current waveform where the current is less than, say, 50% of the peak. This value is not critical, but simply serves as a coarse filter to provide a cleaner waveform for the slope detection algorithm.

It is seen from the above description that it is only necessary to cause current to flow in one phase to detect position. The method is independent of the presence or absence of current, for any reason, in other phases. However, it may be advantageous to apply the method to two or more phases simultaneously, thus increasing the rate at which the rotor position is detected. This may have particular advantage if the speed of the rotor is changing rapidly, either upwards or downwards.

It will be realized that a finite amount of time elapses to build up the continuous current of, for example, FIG. 6 using the voltage pulses of FIG. 7. If it is desired to establish the current more quickly, the duty cycle of the voltage pulses can initially be increased and then, when the desired level of current is reached, reduced to a width which gives sufficient volt-seconds to sustain the current at the desired level.

The embodiments described above detect the onset of pole overlap and hence deduce rotor position. Other embodiments of the invention detect other points on the inductance profile. For example, the position of maximum inductance ($L_{max}$), i.e. the point at which rotor poles are fully aligned with stator poles, can be detected by detecting the middle of the trough in the current waveform. Other points on the current waveform which have a relationship to the inductance profile may likewise be detected. It will also be appreciated that the feature occurs in a single cycle of the waveform. Thus, only current for a single cycle need be established in order for detection to take place. Similarly, it will be realized that the cycle itself need not be continuous, e.g. it optionally comprises several isolated sections which are observed by the controller in order for the feature to be detected.

The method may be applied with equal benefit to machines operating as motors or as generators.

The skilled person will appreciate that variations of the disclosed arrangements are possible without departing from the invention, particularly in the details of the implementation of the algorithms in the controller. It will also be apparent that, while the technique has been described in relation to a switched reluctance machine, it can be used in relation to any machine with a cyclical inductance profile. The method can be applied to a phase whether or not there is excitation applied to any other phases that may be present in the machine. Also, while embodiments of the invention have been described in terms of a rotating machine the invention is equally applicable to a linear machine having a stator in the form of a track and a moving part moving on it. The word 'rotor' is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the drive circuit without significant changes to the operation described above.

What is claimed is:

1. A method of determining the position of a moving rotor of an electrical machine having a stator with at least one phase winding, the method comprising:
    applying a voltage to the phase winding, the voltage waveform having a period which is independent of the period of movement of the rotor, which voltage establishes a current in the phase winding, the current waveform being cyclic with movement of the rotor;
    detecting a predetermined feature in a cycle of the current waveform; and
    deriving rotor position from the occurrence of the feature.

2. A method as claimed in claim 1 in which the current is continuous in the cycle.

3. A method as claimed in claim 2 in which the continuous current is established for a plurality of cycles.

4. A method as claimed in claim 1 in which the electrical machine is a switched reluctance machine.

5. A method as claimed in claim 1 in which the current is established by voltage pulses applied across the phase winding.

6. A method as claimed in claim 5 in which the voltage pulses are of one polarity and the voltage across the phase winding between the pulses is non-zero and of the opposite polarity.

7. A method as claimed in claim 1 in which the current is substantially in steady state.

8. A method as claimed in claim 1 in which the feature in the cycle of the current waveform substantially coincides with a change of gradient of the current waveform.

9. A method as claimed in claim 1 in which the feature in the cycle of the current waveform coincides with the start of rising inductance in an inductance profile of the machine.

10. A method as claimed in claim 1 in which the feature in the cycle of the current waveform coincides with the position of minimum inductance of the phase of the machine.

11. A method as claimed in claim 1 in which the feature in the cycle of the current waveform coincides with the position of maximum inductance of the phase of the machine.

12. A method as claimed in claim 1 in which the rotor is coasting when the method is initiated.

13. A position determination system for a moving rotor of an electrical machine having a stator with at least one phase winding, the system comprising:
    means for applying a voltage to the phase winding, the voltage waveform having a period which is independent of the period of movement of the rotor, which voltage establishes a current in the phase winding, the current waveform being cyclic with movement of the rotor;
    means for detecting a predetermined feature in a cycle of the current waveform; and means for deriving rotor position from the occurrence of the feature.

14. A system as claimed in claim 13 in which the means for applying is operable to establish a continuous current in the cycle.

15. A system as claimed in claim 14 in which the means for applying is operable to establish the current continuously for a plurality of cycles.

16. A system as claimed in claim 13 in which the electrical machine is a switched reluctance machine.

17. A system as claimed in claim 13 in which the means for applying a voltage is operable to generate voltage pulses of one polarity and a voltage across the phase winding between pulses which is non-zero and of the opposite polarity.

18. A system as claimed in claim 13 in which the means for detecting a predetermined feature is operable to detect a change of gradient of the current waveform.

19. A system as claimed in claim 13 in which the means for detecting is operable to detect the point in the current waveform coincident with the position of the start of rising inductance in an inductance profile of the machine.

20. A system as claimed in claim 13 in which the means for detecting a predetermined feature is operable to detect a point coincident with the position of maximum inductance in the phase of the machine.

21. A system as claimed in claim 13 in which the means for detecting a predetermined feature is operable to detect a point coincident with the position of minimum inductance in the phase of the machine.

22. A computer program product which when loaded on a processor is arranged to execute the method of claim 1.

* * * * *